Patented Oct. 2, 1928.

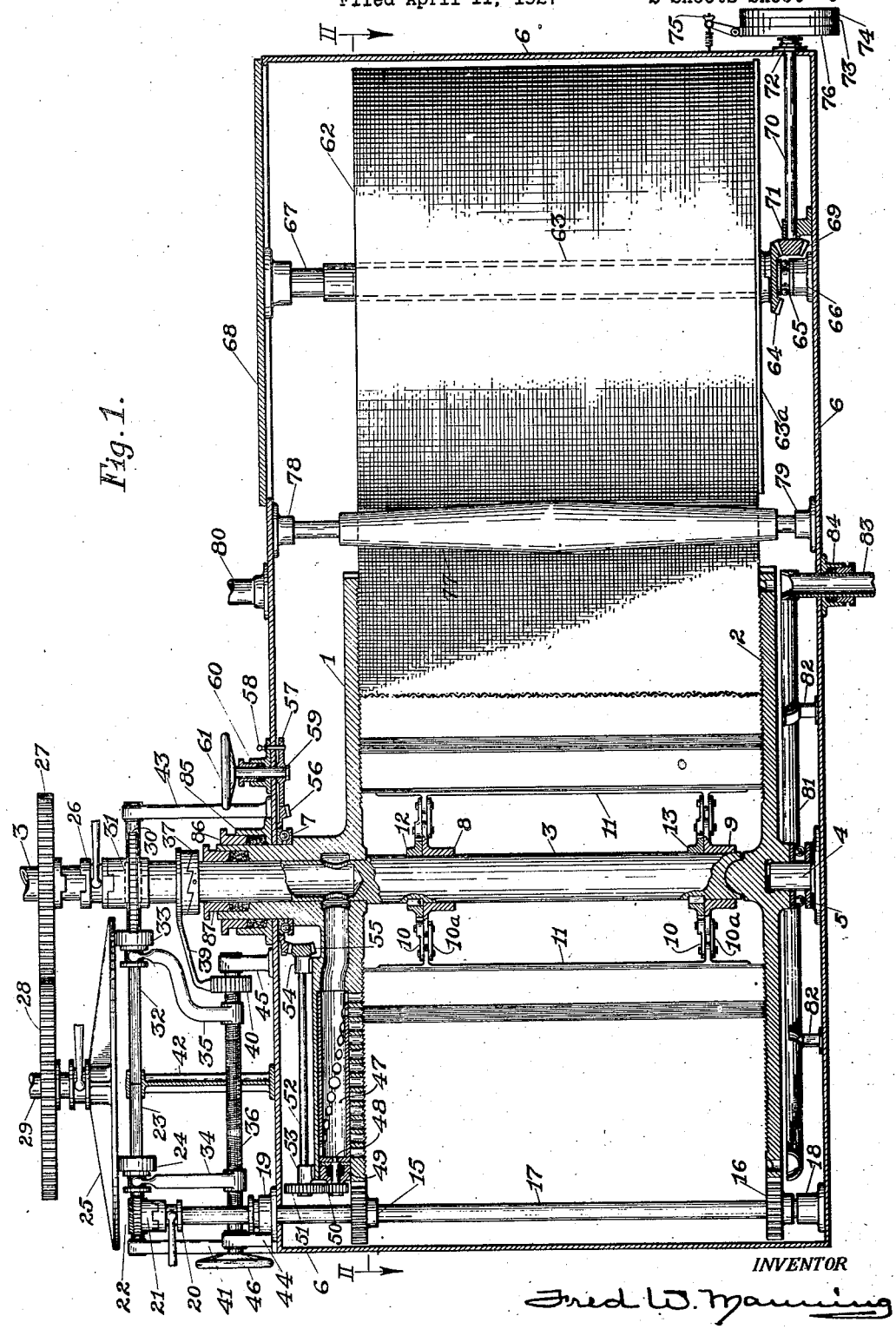

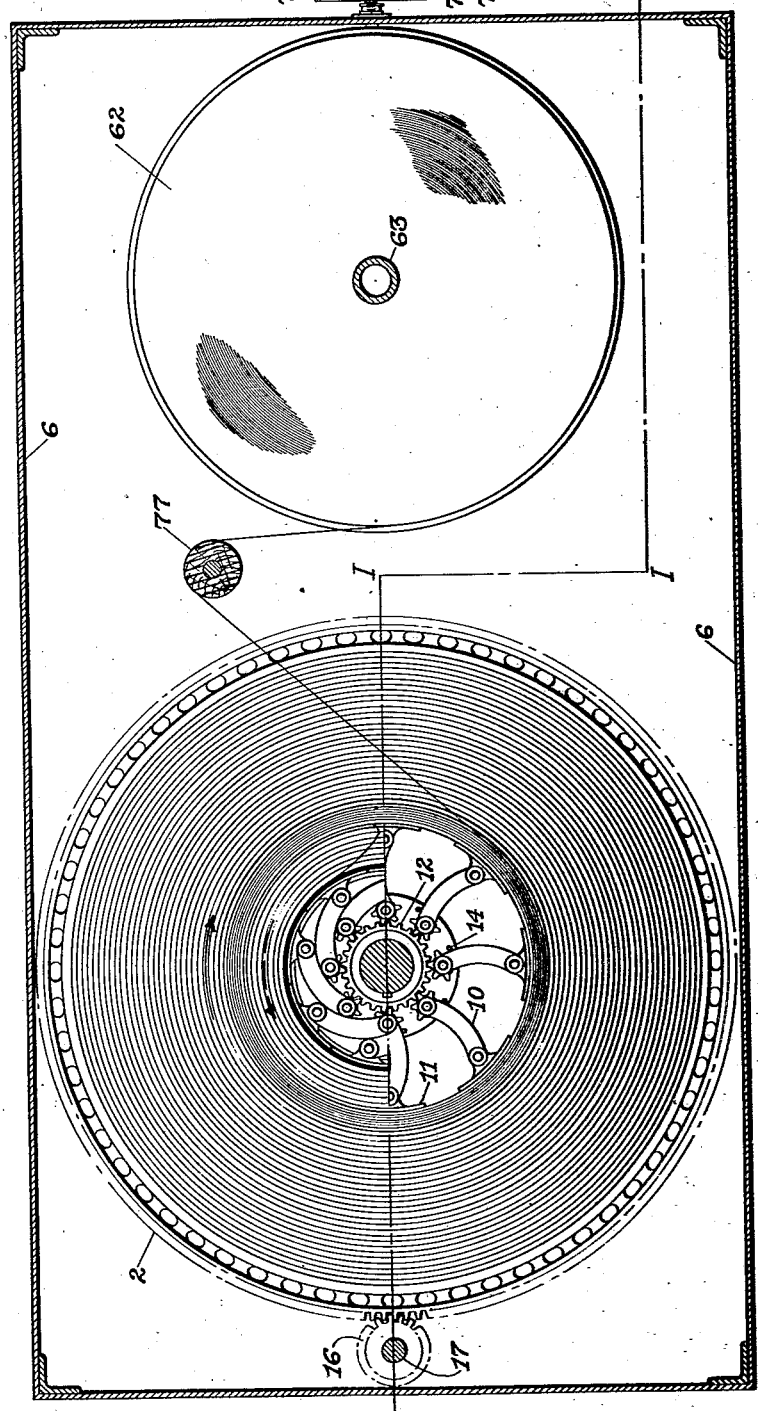

1,686,093

UNITED STATES PATENT OFFICE.

FRED W. MANNING, OF BERKELEY, CALIFORNIA.

PROCESS OF AND APPARATUS FOR CONTINUOUS-PRESSURE FILTRATION.

Application filed April 11, 1927. Serial No. 182,925.

This invention relates to improvements in the continuous treatment of fluids and solids by filtration for the purposes of clarification, decolorization, revivification, extraction, catalysis, precipitation of solids from fluids and for other purposes where it is desirable to contact fluids with solids or vice versa.

It has been the practice heretofore to accomplish the clarification of liquids by means of one thickness or layer of fabric, and if the liquid happened to be of a slimy, mucilaginous, or colloidal character or otherwise difficult to filter, the one thickness was first given a thin precoating of some treating agent, such as kieselguhr or other porous substance so that by means of collection of the impurities on, or distribution of the impurities through the depth of the thin coating, clarity and a better rate of filtrate flow could be obtained. Unfortunately by such methods the treating value of the agent is but very incompletely utilized before it must be discarded or removed for regeneration purposes, the cloudy filtrate or filter cake forming periods results in considerable lost time, and the rate of filtrate flow is exceedingly slow due to the compactness necessary for the retention of all the impurities on or in one thickness of fabric, and its precoating if used. Furthermore, liquids of such character are often volatile and must be handled at high pressures and temperatures and such conditions heretofore have been found incompatible with continuous operations.

As distinguished from such prior methods the present invention includes the advantages of continuous operation at any desired pressure and temperature, absolute clarity at all times without any cloudy filtrate for which provision must be made, a high rate of filtrate flow due to the distribution of the impurities throughout a great many thicknesses of fabric, and the complete utilization of the layers of fabric and treating agents with which the fabric may be impregnated, through action analogous to counter-current treatment.

In carrying out the invention, the fluid to be treated is passed through a plurality of layers of filter treating fabric, which are continuously renewed by the removal of the layer through which the fluid passes first and which has become practically exhausted, and the addition of a fresh layer to the layer through which the fluid passes last, at which time the fluid has already been treated. In this way the treatment is carried out with a maximum of effectiveness. The fabric may be composed of certain treating agents, and may be impregnated with other treating agents as described in my co-pending application, Serial No. 182,926, filed April 11, 1927. The fluids are thus treated in a way analogous to the counter-current method described in my co-pending applications Serial No. 96,343, filed March 20, 1926 and Serial No. 128,900, filed August 12, 1926, but in a more simple way in that the counter-current treating and filtering actions described in these applications are combined in the present invention.

Furthermore, the present invention not only provides what is analogous to an improved counter current process and apparatus for the treating of fluids, but it also provides in same manner for the treating of the utilized treating agents of which the fabric is composed or impregnated, for regenerating the solids or for recovering absorbed or adsorbed fluids therefrom, or for recovering such liquids or other constituents and then subjecting the solids to a regenerating or revivifying treatment. For example, in the recovery of condensable constituents from gaseous mixtures containing them, such as the recovery of casing-head gasoline from natural gas, the invention provides an improved continuous method and apparatus for contacting the natural gas with an absorbent, and the absorbent with its gasoline content to distillation with a gas such as steam, to drive out the gasoline, and a final treatment of the resulting absorbent to regenerate it or put it in condition for further use in treatment of natural gas.

The invention is exemplified in the following description, and one form of apparatus for carrying out the process is illustrated by way of example in the accompanying drawings, in which:

Figure 1 is a longitudinal sectional elevation through the vacuum tank and filter taken on line I—I of Figure 2.

Figure 2 is a sectional plan view of the vacuum tank and filter taken on line II—II of Figure 1.

Referring more specifically to the drawings by reference characters: The principal structural parts of the filter are the filter upper flange 1, filter lower flange 2, and filter shaft 3, which rests upon a central ball portion of the lower flange and passes out through the hub of the upper flange. The lower flange is supported and held in position by means of pivot bearing 4 and ball bearing 5, and the pivot bearing is fastened to the bottom plate of the vacuum tank 6. The upper flange is supported and held in position by means of a shoulder on the filter shaft and an upper ball bearing 7 which is supported by the top plate of the vacuum tank. Upper and lower shoe flanges 8 and 9 respectively are keyed to the filter shaft, and to each is fastened the shoe arms 10 and 10ᵃ upon whose outer ends are attached the shoes 11. Upper and lower gears 12 and 13 respectively keyed to the filter shaft, engage with the toothed inner ends of the shoe arms 10 to bring the shoes into extended or nesting position as required, and pins 14 in the shoe flanges prevent backward movement of the arms after they have reached extended position.

The upper and lower filter flanges are driven by gears 15 and 16 respectively keyed to drive shaft 17. The lower end of the drive shaft turns in footstep bearing 18 and its upper end passes out of the vacuum tank through stuffing box 19, and by means of jaw clutch 20 engages with gear clutch 21 which is driven by worm gear 22 on shaft 23, and the latter is driven through friction roller 24 by friction plate 25.

The filter shaft, when rotated in the same direction as the filter flanges, is driven by means of jaw clutch 26 engaging with gear clutch 27 and the latter is driven by gear 28 on the main drive shaft 29. When the filter shaft is rotated in the opposite direction to the filter flanges, clutch 26 is engaged with gear clutch 30 which is driven by worm gear 31 on shaft 32, and the latter is driven through friction roller 33 by the friction plate. The movements of the friction rollers 24 and 33 across the face of the friction plate are controlled by means of clutch arms 34 and 35 respectively, and the latter are actuated by the outer and inner threads respectively on the screw 36. Screw 36 is rotated by means of a ratchet clutch 37 pinned to the filter shaft which engages with a ratchet arm 39, and the latter causes the star wheel 40 keyed to the screw shaft to move one tooth for each revolution of the filter shaft. The friction roller shafts are supported by bearing brackets 41, 42, and 43, and the screw shaft is supported by bearings 44 and 45. Hand wheel 46 on the end of the screw shaft is used to return the friction rollers to their original positions.

A rotary feed valve 47 situated in the upper filter flange, has openings in its circumference which are at all times coincident with the openings in the filter flange between the annular windings in use and the contaminated windings wound upon the nested shoes. The valve is rotated by means of a pin 48 which passes through stuffing box 49 and to whose outer end is keyed spur gear 50, and the latter meshes with spur gear 51 keyed to the outer end of shaft 52 which is supported in bearings 53 and 54. Bevel gear 55 keyed to the inner end of the shaft, is given a slight rotative movement periodically by means of a suitable number of bevel teeth uniformly spaced on the side of the spur gear 56, and the latter meshes with and is held in a fixed position by means of spur gear 57 which is locked in position by pin 58. This spur gear is keyed to shaft 59 which passes through stuffing box 60 and is rotated by hand-wheel 61 for the purpose of returning the rotary feed valve to its original position, during which operation the pin must be removed.

The reserve filter fabric windings 62 are wound upon a spool 63 whose lower flange 63ᵃ engages with bevel gear clutch 64 and both spool and clutch are supported by ball bearing 65 and footstep bearing 66. The upper end of the spool is centered and also supported by pin 67 fastened to the cover plate 68. The windings may be removed from the filter and wound upon the spool when required, through the clutch bevel gear meshing with bevel gear 69 on shaft 70 which is supported by bearing 71 and which passes out of the vacuum tank through the stuffing box 72 and takes the tight and loose pulleys 73 and 74. Adjusting screw 75 and brake pulley 76 are used to place the required tension on the windings during filtering operations.

Crowned guide roller 77 supported by upper bearing 78 and lower bearing 79, is used to somewhat narrow the fabric belt previous to feeding it between the filter flanges. Vapor and gases are withdrawn through outlet pipe 80, and the condensate or other filtered fluid is collected in trough 81 supported by brackets 82, and discharged through pipe connection 83 which passes out of the vacuum tank through stuffing box 84. Stuffing box 85 and gland 86 prevent leakage at the point where the hub of the upper filter flange passes out of the vacuum tank, and gland 87 prevents leakage where the filter shaft passes out of the hub of the upper filter flange.

The operation of the apparatus thus constructed has been in part indicated in connection with the foregoing description. Handwheel 61 is turned to rotate rotary feed valve 47 to its initial feeding position and then pin 58 is dropped into position in order to prevent further rotation of the gear 57. Handwheel 46 is turned to bring the friction rollers 24 and 33 to their initial positions, which in each case will be near but on opposite sides of the circumference of the friction plate. The outer end of the filter fabric roll 62 is carried over crown guide roller 77 and attached to one of the shoes 11 upon which jaw clutch 20 is thrown into mesh with gear clutch 21 which is driven through worm 22, shaft 23 and friction roller 24 by friction plate 25 on the main drive shaft 29, and jaw clutch 26 is thrown into mesh with gear clutch 27 driven by gear 28 also on the main drive shaft 29. This causes both the filter shaft and flanges to rotate in the direction of the full arrow, and the rotation of the shaft in this direction causes the shoe arms 10 and 10ª, first to assume an extended position and then to rotate in the same direction. The rotation of the filter shaft is continued in the direction of the full arrow until a sufficient depth of annular windings has been built up, whereupon clutch 26 is disengaged from gear clutch 27 and engaged with gear clutch 30 which is driven through worm 31, shaft 32 and friction roller 33 by the friction plate 25, thereby reversing the direction of the filter shaft. This causes the shoe arms first to assume a nesting position and then to turn in the direction of the dotted arrow carrying with them the inside end of the annular windings.

The fluid to be filtered is now turned into the hollow filter shaft 3 and after entering into the rotary feed valve 47 passes out through those valve openings which are coincident with the top flange openings to the space between the annular windings and the utilized fabric wound about the nesting shoes. As the fluid filters through the windings the condensate, if a vapor is being filtered, or other liquid flows through the openings near the circumference of the lower flange and is caught in trough 81 and carried out through pipe 83, and the vapors are carried off through outlet 80.

In order that the depth of treating fabric windings may be maintained constant and that every unit of the fabric be contacted to the same extent with the fluid being filtered, it will be necessary under certain conditions to continuously alter the speeds of rotation of both the filter shaft and the annular windings. This is accomplished by means of the pitches of the two threads on the screw shaft 36, and through the ratchet clutch 37 pinned to the filter shaft, which engages and causes ratchet arm 39 to move star wheel 40 keyed to the screw shaft 36, to move one tooth for every revolution of the filter shaft.

The space between the removed utilized fabric and the annular windings may decrease as the diameter of the windings increase, but the rotary feed valve gearing actuated by the rotation of the filter flanges, must be such that the ports opened by the rotation of the valve are always coincident with the openings through the flange into this annular space. The grooves on the inside of both flanges are of suitable shape so that internal pressure on the annular windings makes a joint between the fabric and the windings.

It will thus be seen from the foregoing description that the movement of a fluid in a given direction is at a faster rate than the movement of the contacting solids in the same direction, and the removal of the surface portion of the solids through which the fluid passes first, and the addition of fresh solids to the surface portion through which the fluid passes last, result in an efficiency of treatment analogous to that obtained by counter-current means but without the necessity of additional means for clarification purposes.

It will also be evident that if the treating fabric material is made up so that the entire depth of the annular windings is required to give absolute clarity, the coarser solids will be retained by the first layers through which the fluid passes, and the finer solids by the succeeding layers, and by their distribution throughout the entire depth of windings, a rate of flow of filtrate can be obtained that could not possibly be obtained by one thickness of fabric of lesser thickness than the total depth of the annular windings.

It will furthermore be evident that after the treating fabric has been completely utilized for say the decolorization and clarification of oils and entirely wound upon the nesting shoes, it may be quickly removed by rewinding it on the reserve spool and the filtering operation repeated for the purpose of washing the impurities from the treating fabric. The operation may then be again repeated for the purpose of impregnating the fabric by passing a conveying fluid therethrough containing a catalytic agent which may be in the form of either a fluid or fine solid particles.

It will still furthermore be evident that when it is not desirable to filter a fluid such as a hydrocarbon vapor under suction means, the vacuum tank may be dispensed with and a super-atmospheric pressure used to force the fluid through the annular windings, in which case other means may be used to support the filter mechanism and fabric reserve roll in either a vertical or horizontal position.

Having thus described my invention, what I claim is:

1. A filtering process consisting of passing a fluid through a filter member having a plurality of layers of treating fabric, removing the inlet surface layer of the member to provide fresh filtering surface to the fluid to be filtered, and adding fresh treating fabric to the outlet surface layer of the member.

2. A filtering process consisting of passing a fluid through a filter member having a plurality of layers of treating fabric, continuously removing the inlet surface layer of the member to provide fresh filtering surface to the fluid to be filtered, and simultaneously adding fresh treating fabric to the outlet surface layer of the member.

3. A filtering process consisting of passing a fluid through a filter member having a plurality of layers of treating fabric, removing the inlet surface layer of the member to provide fresh filtering surface to the fluid to be filtered, and adding a layer of fresh treating fabric to the outlet surface layer of the member, the rate of removal and application of the said layers maintaining the number of layers in such member through which the liquid to be filtered passes, constant.

4. A filtering process consisting of passing a fluid through a filter member having a plurality of layers of treating fabric, continuously removing the inlet surface layer of the member to provide fresh filtering surface to the fluid to be filtered, and continuously adding a layer of fresh treating fabric to the outlet surface layer of the member, the rate of removal and application of the said layers maintaining the number of layers in such member through which the liquid it be filtered passes, constant.

5. A filtering process consisting of building up a filter member of a plurality of layers of treating fabric, passing a fluid through said filter member, continuously removing the inlet surface layer of the member to provide fresh filtering surface to the fluid to be filtered, and simultaneously adding fresh layer of treating fabric to the outlet surface portion of the member, the rate of removal and application of the said layers maintaining the number of layers in such member through which the liquid to be filtered passes, constant.

6. A filtering process consisting of passing a fluid through a filter member having a plurality of layers of treating fabric, removing the inlet surface layer of the member in a direction opposed to the flow of the fluid, and adding fresh treating fabric to the outlet surface layer of the member, in a direction the same as the flow of the fluid.

7. A filtering process consisting of passing a fluid through a filter member having a plurality of layers of treating fabric, continuously renewing said layers by the removal of the contaminated layers in a direction opposed to the flow of the fluid and the addition of fresh layers in a direction the same as the flow of the fluid.

8. A filtering process consisting of passing a fluid through a filter member, continuously renewing the member and simultaneously advancing the member in a direction the same as the flow of the liquid but at a relatively reduced rate of speed.

9. A filtering process consisting of passing a fluid through a filter member, and simultaneously advancing the member in the same direction as that of the fluid flow but at a relatively reduced rate of speed.

10. In a filter, a hollow cylindrical filter member means within the member cooperating therewith for removing the inner surface portion of the member, and means exteriorly of the member for adding to the exterior surface portion of the member.

11. In a filter, a hollow cylindrical filter member having a plurality of layers of treating fabric, means within the member cooperating therewith for removing the inlet surface layer of the member, and means exteriorly of the member for adding a fresh layer of treating fabric to the exterior surface layer of the member.

12. In a filter, a filter member comprising a roll of filter fabric, a storage member connected to one end of the fabric, means for rotating the storage member to remove a portion of the fabric, and means for rotating the filter member to add thereto a fresh portion of fabric.

13. In a filter, a filter member comprising a roll of filter fabric, a storage member connected to one end of the fabric, a reserve member connected to the other end of the fabric, means for rotating the storage member to remove a portion of fabric from the filter member and means whereby a fresh portion of fabric is removed from the reserve member and wound upon the filter member.

14. In a filter, a filter member comprising an annular roll of filter fabric, means for forcing the fluid to be filtered outwardly through the roll, a storage member within the filter member connected to the inner end of the fabric, means for rotating the storage member to remove the inner layer of fabric, a reserve member exterior of the filter member connected to the outer end of the fabric, and means for rotating the filter and reserve members to transfer a fresh portion of filter fabric from the reserve member to the filter member.

15. A filtering process consisting of passing a fluid through a filter member formed of layers of filter material, removing the fluid inlet surface portion of the member to provide fresh filtering surface to the fluid to be filtered, and adding a fresh filter layer to the outlet surface portion of the member.

16. A filtering process consisting of passing a fluid through a filter member formed of layers of filter material, continuously removing the inlet surface portion of the member to provide fresh filtering surface to the fluid to be filtered, and simultaneously adding a fresh filter layer to the outlet surface portion of the member.

17. A filtering process consisting of passing a fluid through a filter member formed of layers of filter material, building up the filtered out solids on the fluid inlet surface layer, removing the said inlet layer to form a conveyor for the filtered out solids, and simultaneously adding a fresh layer of filter material to the fluid outlet surface portion of the member.

18. In a filter, an enclosure having a circumscribing wall formed of layers of filter material into which fluid to be filtered is delivered, means for continuously removing the inner surface of the wall and simultaneously applying a fresh layer to the exterior surface to maintain the wall at a constant thickness.

19. In a filter, an enclosure having a circumscribing wall formed of layers of filter material, storage means arranged interiorly of the enclosure, supply means arranged exteriorly of the enclosure, and means for continuously transferring the inner layer of the wall to the storage means and for simultaneously applying a fresh layer to the exterior of the wall from the supply means.

20. In a filter, a fluid treating chamber, having inlet and outlet ports, a wall formed of layers of filter material separating the inlet and outlet ports and through which the fluid to be filtered must pass, and means for maintaining the wall at a constant thickness by simultaneously removing a layer of filter material from the inlet side of said wall and adding a layer of fresh filter material to the outlet side of said wall.

21. In a filter, a primary chamber for receiving fluid to be filtered, a secondary chamber for receiving the filtered fluid, a partition formed of a plurality of contiguous layers of filter material between the primary and secondary chamber, means for continuously removing layers of filter material from the partition within the primary chamber and applying fresh layers of filter material to the partition within the secondary chamber to maintain the partition at constant thickness.

22. In a filter, a filter wall comprising a plurality of layers of filter fabric, a supply means and a storage means, means for continuously transferring the fabric from the supply means to the storage means by the simultaneously winding and unwinding of the fabric filter wall while maintaining it at a constant thickness, and means for introducing fluid to be filtered within the confines of the filter wall whereby it may pass therethrough to be filtered.

FRED W. MANNING.